May 22, 1945. H. F. STORM 2,376,522
ELECTRIC GOVERNOR
Filed July 13, 1942 3 Sheets-Sheet 1
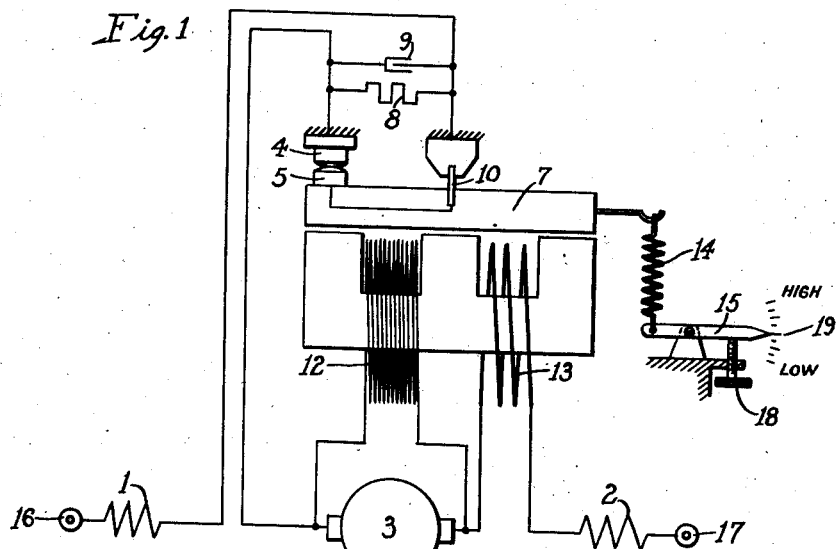
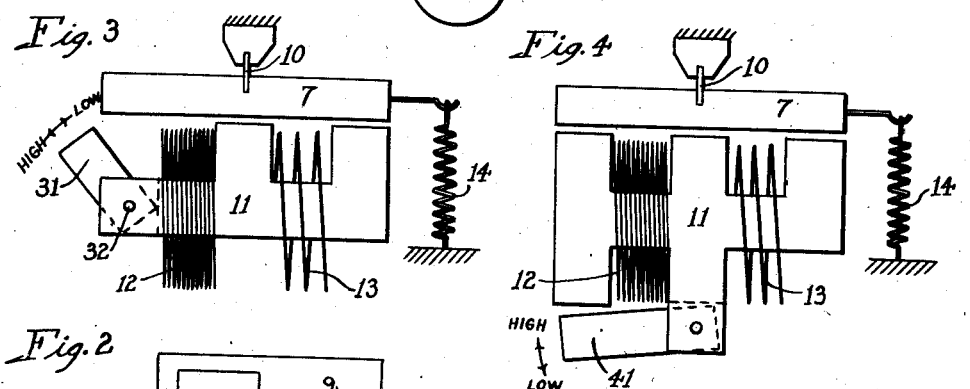
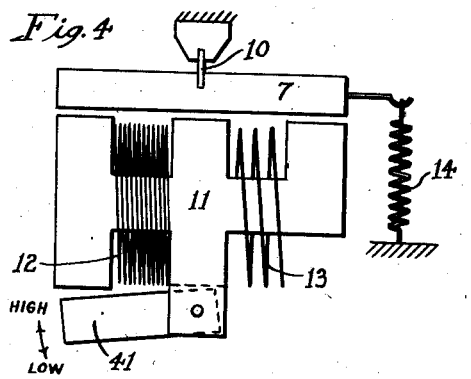
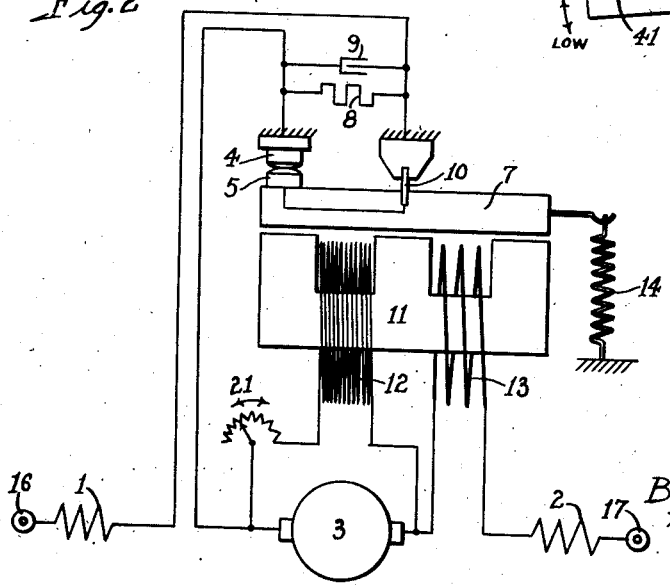
Inventor:
Herbert F. Storm
By McCanna, Winterom & Morsbach
Attys.

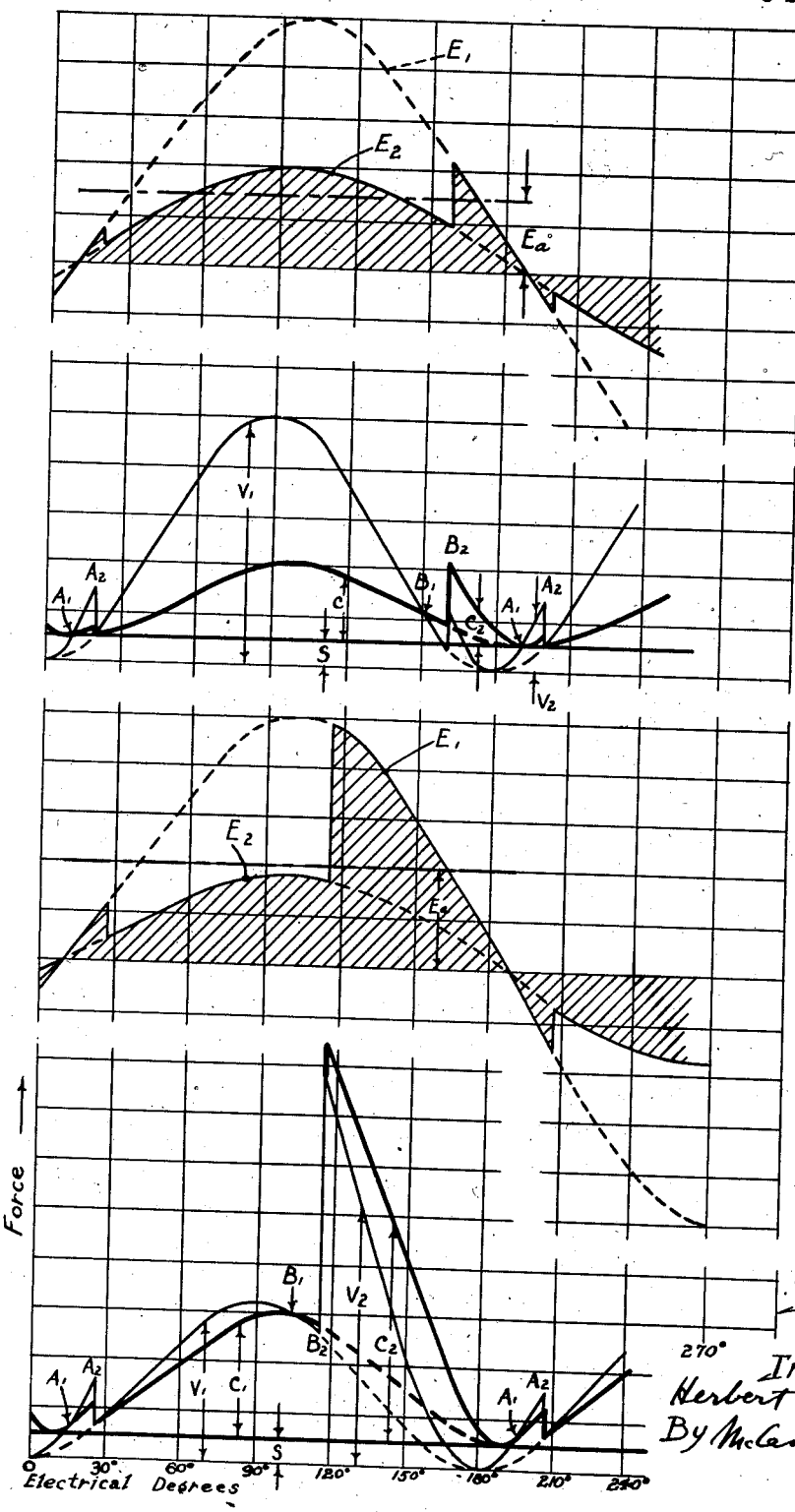

Patented May 22, 1945

2,376,522

UNITED STATES PATENT OFFICE 2,376,522

ELECTRIC GOVERNOR

Herbert F. Storm, Chicago, Ill., assignor to Chicago Flexible Shaft Company, Chicago, Ill., a corporation of Illinois Application July 13, 1942, Serial No. 450,786

27 Claims. (Cl. 171—229)

This invention relates to electrical regulating systems or governors for electric motors.

The primary object of my invention is to provide improved methods and electric governor apparatus for maintaining a desired speed under variations in the load and variations in the voltage of the available current source in the operation of an electric motor.

Another object is to provide an electric governor of this kind having improved means for controlling the speed.

Another object is to provide an improved electric governor of this kind which is applicable to direct current motors, alternating current motors, and universal motors.

My invention also aims to provide an electric motor incorporating a regulating system of this kind which is capable of general application and particularly as a prime mover for electrical appliances.

In furtherance of these general objects my invention contemplates an electric governor characterized by the provision of a relay having at least two windings, one having many turns of a fine wire and energized by the voltage of the motor armature or a function thereof, and the other having few turns of a thick wire and energized by the motor current or a function thereof, these windings acting upon the relay armature which is arranged to control make-and-break contacts for the motor current, the said windings acting in such manner upon the relay armature that the motor current energized winding induces the relay armature to move in a motor current increasing sense, while the winding energized by the voltage of the motor armature induces the relay armature to move in a motor current decreasing sense, the conjoint function serving to maintain a given motor speed according to a speed control setting acting in conjunction with the relay armature.

Furthermore, my invention contemplates an improved electric governor of the character described having certain advantages in comparison with what is known as mechanical governors, namely: (1) greater freedom in the construction of the motor, particularly because no mechanical connections exist between the motor and the governor; (2) greater power output and better efficiency of the motor because the electric governor consumes far less power than the mechanical type; (3) the mechanical power requirements for changing the governor from one speed to another speed are very small and can be reduced to a minimum by the use of electronic tubes; and (4) the electric governor is well adapted for remote control.

Other objects and attendant advantages will be appreciated by those skilled in this art as the invention becomes better understood by reference to the following description when considered in connection with the accompanying drawings, in which—

Figure 1 is a diagrammatic drawing of an electric governor embodying my invention;

Fig. 2 shows a modified form employing an adjustable resistor in the speed control means;

Figs. 3 and 4 show further modifications, described hereinafter; and

Figures 9, 10:
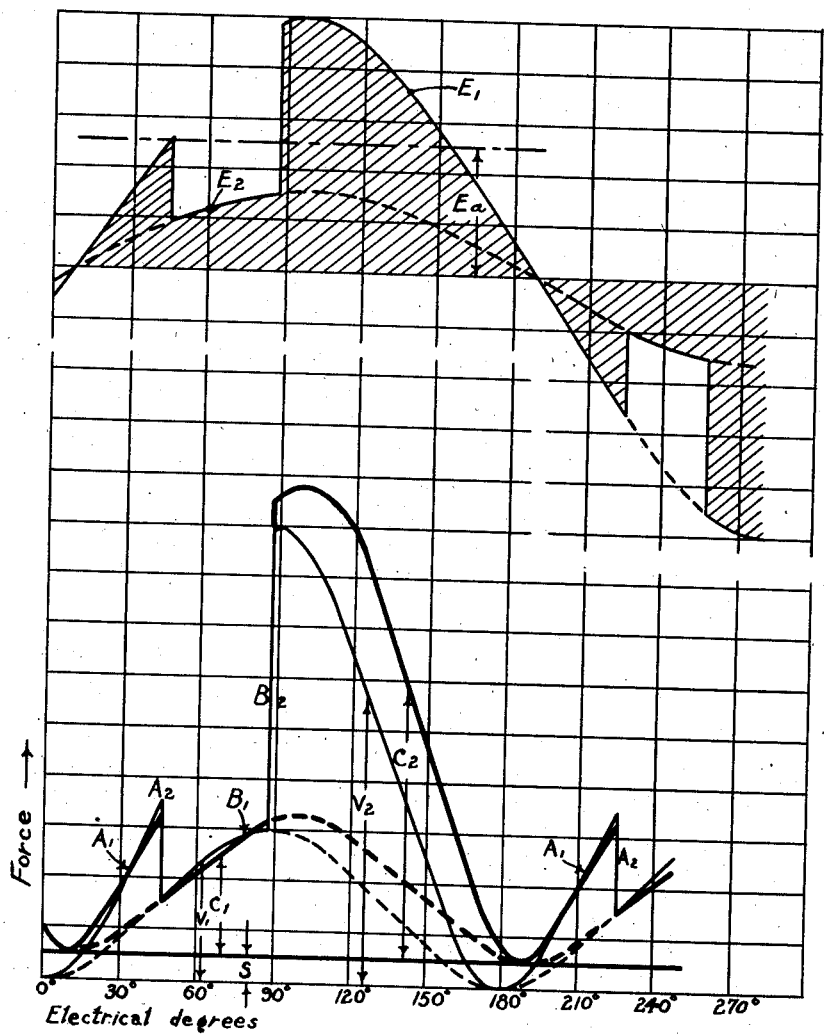

Figs. 5 to 10 are graphs illustrating the forces acting on the relay where my invention is applied to an alternating current motor, Figs. 5 and 6 showing the forces under an assumed load, Figs. 7 and 8 under an increased load, and Figs. 9 and 10 under a further increased load.

This electric governor may be termed more specifically an impedance governor, for the governing element is a relay which responds largely to the impedance of the motor to be controlled. The principle of my invention and its manner of use is here illustrated diagrammatically. In the drawings, Figure 1 shows a universal motor with two field windings 1 and 2, and an armature 3, all in series. Inserted into this circuit is a pair of contacts 4 and 5 which, if closed, permit the unobstructed flow of the current and, if open, force the current through a resistor 8, thus diminishing the current. The contact 5 is fastened on the armature 7 of a governor relay of novel design and is energized through a hinge 10 of spring material. The armature 7 is exposed to the magnetic pull of a three-legged core 11. This core 11, the contact 4, and the support for the spring hinge 10 are stationary, in this embodiment. Two coils 12 and 13 are arranged for energizing the core 11. Coil 12 is preferably connected in parallel to the armature 3 of the motor, while coil 13 is connected in series between the armature 3 and the field 2. The coil 12 has many turns of fine wire, while the coil 13 has a few turns of a thick wire. When the coil 12 is energized the left side of the relay armature is attracted and tends to open the contacts. When the coil 13 is energized the right side of the relay armature is attracted and tends to close the contacts. A spring 14 acts on the relay armature 7 and exerts a closing tendency for the contacts 4 and 5.

When the terminals 16 and 17 of the motor are connected to a current supply line, the current will flow through field 1, hinge 10, contacts 5 and 4, motor armature 3, current coil 13, and field 2. Due to the voltage drop across the armature 3, part of the current will branch off through the voltage coil 12. In the initial period, the motor armature 3 begins to accelerate from rest, hence the voltage across the armature 3 is low and the pull of the voltage coil 12 which is energized by the voltage across the armature 3, is by far smaller than the pull of the current coil 13 which carries the inrush current. Consequently, the contacts 4 and 5 remain closed and the motor gains in speed. With increasing speed of the motor armature, the voltage across the armature increases, and at the same time the current through the motor decreases. The effect is an increasing pull of the voltage coil 12 and a decreasing pull of the current coil 13. Finally, the contacts 4 and 5 will break, thus forcing the current through the resistor 8 and the acceleration of the motor will come to an end, at least temporarily. The insertion of the resistor 8 reduces not only the current of the current coil 13, but also the current of the voltage coil 12. The spring 14 is now strong enough to tip the balance between the two opposing forces of the two relay coils and re-close the contacts 4 and 5. The current will again flow through the motor as above described and again it will be interrupted by the action of the voltage coil 12. The described cycle of making and breaking the circuit is repeating while the motor is acquiring a steady speed. The resistor 8 is shunted by a condenser 9.

Variations of the supply voltage do not affect the speed of the controlled motor. Assuming the line voltage has risen, the motor tends to gain speed. Due to increased speed, however, more current is branched off through the voltage coil 12, thus increasing the opening tendency of the contacts 4 and 5, thereby shortening the interval of current supply.

Speed control may be achieved by various means. In Fig. 1 I have shown a spring 14 one end of which is connected to the relay armature 7 while the other end is connected to a lever 15. The position of the lever 15 is determined by a speed control screw 18. When the screw 18 is turned in an upward direction, the lever 15 is turned counter-clockwise and, consequently, more pressure is applied to the spring 14. The increased tension on spring 14 increases the closing tendency of the contacts 4 and 5, thus providing more current for the motor which, in turn, increases the speed of the motor. The lever 15 is conveniently associated with a dial 19 which is calibrated in motor speeds. When the screw 18 is turned in the reverse direction, the motor decreases its speed.

In Fig. 2 I have shown an alternative means for speed control, which consists in inserting an adjustable resistor 21 into the circuit of the voltage coil 12. The more resistance is inserted, the less is the voltage on the relay winding 12, the longer the contacts 4 and 5 remain closed and, consequently, the faster the motor will run.

In Fig. 3 I have shown a further modification in the speed control, which consists in the use of a movable leg 31 of the core 11. This leg 31 is pivoted to the core at 32. The leg 31 can be set by means well known in the art to any desired position between the vertical in which it is perpendicular to the relay armature 7 (corresponding to the lowest speed) and a position parallel to the relay armature 7 (corresponding to the highest speed). Upon withdrawing the leg 31 from the relay armature 7, the magnetic pull of the voltage coil 12 decreases, thus increasing the closing interval of the contacts 4 and 5 and resulting in a greater motor speed.

In Fig. 4 I have shown a further modification. Instead of having the leg 31 movable, an adjustable magnetic shunt 41 is used in conjunction with a modified form of core 11. Here, as in Fig. 3, any suitable or desired means may be employed for adjusting the movable member. In view of the foregoing description this adjustment of the shunt member 41 for purpose of speed control will be obvious.

However, the measures for speed control as described above are not restricted to the voltage coil. They may be applied directly, or modified, to the current coil. Furthermore a combination of these control principles may be used in actual practice.

The operating characteristic of the electric governor depends upon the size of the electromagnetic time constants $$\frac{L}{R}$$

(L inductance, R resistance) of the voltage coil circuit and the current coil circuit. In order to obtain desirable values for the time constants, known means may be used, as for instance, insertion of additional resistances, reactances, capacitances, directly or in bridges, secondary windings for relay coils which are either shorted or connected to impedances, or which are interconnected.

One of these possibilities is mentioned particularly: a case where the shortening of the magnetic time constant is desirable for the voltage coil. This can be achieved by inserting an extra series resistor into the voltage coil circuit. However, the following solution is more favorable for other reasons, in which the voltage coil consists of a great number of turns of very fine wire. In such case the costs of manufacturing the coil increase with increasing number of turns and decreasing cross section of the wire. These disadvantages can be avoided and, in addition, the magnetic time constant decreased, as desired, by using a material for the winding of the voltage coil which has a lesser electric conductivity than copper, thus allowing for a smaller number of turns, an increased cross section of the wire, and a smaller ratio $$\frac{L}{R}$$

My invention is further illustrated by reference to the graphs shown in Figs. 5 to 10.

Assuming the motor is energized by alternating current and idling, the various forces acting on the relay are plotted in the graphs of Figs. 5 and 6. In considering these graphs, as well as the graphs Figs. 7 to 10 inclusive, the following functional designations are used:

$E_1$ is line voltage;
$E_2$ is motor voltage, the line voltage minus drop in resistor 8;
$E_a$ is average voltage acting on the motor;
$S$ is spring pull.

With contacts open:
$V_1$ is pull of voltage coil;
$C_1$ is pull of current coil;
$B_1$ is point where pulls on each side of relay armature 7 are equal ($V_1 = C_1 + S$);
$A_2$ are points where contacts open.

With contacts closed:
$V_2$ is pull of voltage coil;
$C_2$ is pull of current coil;
$B_2$ are points where contacts close;
$A_1$ are points where pulls on each side of relay armature 7 are equal ($V_2 = C_2 + S$).

Let us consider Figs. 5 and 6, the instant at 90 electrical degrees. The voltage coil 12, Fig. 1, develops a mechanical force $V_1$, which fluctuates with twice the frequency of the line voltage and which acts in a contact opening sense. Opposite to this sense the pull S of the spring 14 which is constant as long as the spring is not re-adjusted, and the force $C_1$ developed by the current coil 13, are acting, the former fluctuating with twice the current frequency. At the contemplated instant of 90 electrical degrees, the contact opening force $V_1$ is larger than the contact closing forces $S+C_1$. Hence, the contact is open. The line voltage is denoted by $E_1$. Since the contact is open, the current produces a voltage drop in the resistor 8 so that the effective voltage on the motor is reduced to $E_2$. As time goes on, the point $B_1$ at 152 electrical degrees is reached where the closing forces $S+E_1$ are equal to the opening force $V_1$. In the next instant, the closing forces become larger than the opening forces and the contact would close immediately if inertia and friction would not hinder instantaneous action. The aforementioned impediments are responsible for a certain time interval $B_1$ to $B_2$, Fig. 6, which lapses until the relay found all the time it needs for closing the contacts at $B_2$ (162 electrical degrees). When this happens, the resistor 8 is shorted; hence the motor (and the relay) is now connected to the full line voltage $E_1$. The result is that the current of the motor and the voltage across the motor armature 3, Fig. 1, increases. The increased current now produces a relatively much larger mechanical force $C_2$ on the relay which, in addition to the unchanged spring pull S, tends to hold the contact closed against the opening tendency of the force $V_2$ of the voltage coil 12, the former also being increased after the closing of the contacts. The contact closing forces remain superior until the point $A_1$ at 190 electrical degrees is reached, where both forces become equal. Thence $V_2$ becomes superior and tends to open the contacts. Again, because of the inertia and friction, the contacts cannot follow immediately, but take their time $A_1$ to $A_2$ until they open. At $A_2$ the contacts finally open and insert the resistor 8 into the circuit again. The effective voltage on the motor drops back to $E_2$ and the forces of the current and voltage coils are back at the values of $V_1$, respectively $C_1$, from which point we started the explanation. The average voltage, which was acting on the motor, is denoted by $E_a$ and amounts to approximately 40% of the R. M. S. value of $E_1$.

Assume now, that the motor is somewhat loaded. There will be a subsequent increase in current and a decrease in voltage across the armature terminals 3. The increase in current increases the pull $C_2$ of the current coil, while the reduction in voltage reduces the pull $V_1$ of the voltage coil, as shown in Figs. 7 and 8. The intersection of $C_1$ and $V_1$ occurs now at an earlier time, namely, at 106 electrical degrees compared with 152 electrical degrees in the case illustrated in Figs. 5 and 6. The contacts close at 116 electrical degrees ($B_2$) as compared to 162 electrical degrees in the former example. The full voltage $E_1$ is, therefore, applied through a longer fraction of the period, which means that the average voltage $E_a$ was increased, and that to approximately 60% of the R. M. S. value of $E_1$. Thus the governor produced the desired increase of effective voltage at the motor terminals with increased load.

If the load is still further increased, the intersection $B_1$ occurs still earlier as shown in Figs. 7, 9, and 10. The full line voltage $E_1$ is now applied over the greatest part of the period. The average voltage was increased to approximately 75% of the R. M. S. value of $E_1$. A still further increase in the load would increase the pull of $C_1$ so that it would be greater than $V_1$ at all times. This means that the contact would stay closed continuously and full line voltage $E_1$ is continuously applied. The upper limit of the control range is herewith attained.

While this description assumed the motor to be energized by alternating current, the governor may also be applied to direct current energization. Furthermore, by proper combination of the spring force and the magnetic pulls, and the electro-magnetic time constants, one may obtain any of the following: decreased speed with increased load, constant speed with changing load, and increased speed with increased load, within the power limits of the motor.

I claim:

1. In combination with an electric motor provided with an armature, an electric governor comprising a relay having at least two windings, one winding being energized by the motor current or a function thereof, the other winding being energized by the voltage of the motor armature or a function thereof, the two windings acting upon the relay armature, current being supplied to the motor by make-and-break contacts controlled by the relay armature, said windings acting in such manner upon the relay armature that the motor current energized winding induces the relay armature to move in a motor current increasing sense, while the winding energized by the voltage of the motor armature induces the relay armature to move in a motor current decreasing sense.

2. An electric governor as set forth in claim 1, including a spring acting upon the relay armature tending to close the contacts.

3. An electric governor as set forth in claim 1, including a spring acting upon the relay armature tending to close the contacts, and in which the motor current energized winding together with the spring force induce the relay armature to move in a motor current increasing sense.

4. An electric governor as set forth in claim 1, including a spring acting upon the relay armature tending to close the contacts, and means for adjusting the tension of the spring for controlling the speed.

5. An electric governor as set forth in claim 1, including an adjustable resistor in series with the second described winding to control the speed.

6. An electric governor as set forth in claim 1, in which the relay includes means for varying the reluctance of the magnetic path whereby to control the speed.

7. An electric governor as set forth in claim 1, in which the main magnetic circuit of the relay is shunted by an adjustable magnetic shunt to control the speed.

8. An electric governor comprising a relay having a core provided with pole faces at opposite ends, a coil on the core having many windings of relatively fine wire for energizing one of said poles, another coil on the core having few windings of relatively thick wire for energizing the other of said poles, an armature for the relay having pole faces at opposite ends complemental to those on the core, said armature being pivoted intermediate its ends so that upon pivotal movement back and forth the gap between one set of pole faces will be closed and opened and the other set will be moved in the reverse order, an electric motor, make-and-break contacts controlled by said pivotal movement of the relay armature, and a current supply circuit for the motor, said contacts being in series with the motor between its field and armature at the input side, the second described coil being in series with the motor between its armature and field at the output side, the first described coil being connected in parallel with the motor armature between said contacts and the second described coil, the said coils acting in such manner upon the relay armature that the second described coil induces the relay armature to move in a motor current increasing sense, while the first described coil energized by the voltage of the motor armature induces the relay armature to move in a motor current decreasing sense.

9. An electric governor as set forth in claim 1, in which the relay includes means for varying the reluctance of the magnetic path by making a leg of the core movable to increase or decrease the gap between the movable leg and the armature.

10. An electric governor as set forth in claim 1, in which the relay includes means for varying the reluctance of the magnetic path by making a leg of the core movable to divert more or less flux from flowing from the core to the armature.

11. In combination, an electric motor, and an electromagnetically controlled means energized by the voltage and the current of the motor or a function thereof for changing the current intensity by increasing the current intensity when the motor current tends to increase and decreasing the motor current intensity when the voltage of the motor armature or a function thereof tends to increase.

12. A governor for an electric motor having an armature, comprising electro-magnetically controlled means for changing the intensity of an electric current and comprising at least two windings, one of said windings being energized by the current traversing said motor, the other of said windings being energized by the voltage of the motor armature or a function thereof, the two windings acting electro-magnetically on said means for changing the intensity of an electric current, said windings acting in such a manner that the motor current energized winding induces the means for changing the current intensity in a motor current increasing sense, while the winding energized by the voltage of the motor armature induces the means for changing the current intensity in a motor current decreasing sense.

13. A governor for an electric motor having an armature, comprising electro-magnetically controlled means provided with a contact and at least two windings, one of said windings being energized by the motor current or a function thereof, the other of said windings being energized by the voltage of the motor armature or a function thereof, the two windings acting electro-magnetically on said contact, current being supplied to the motor by said contact, said windings acting in such manner upon the contact that the motor current energized winding induces said contact to move in a motor current increasing sense, while the winding energized by the voltage of the motor armature induces said contact to move in a motor current decreasing sense.

14. A governor for an electric motor having an armature, comprising electro-magnetically controlled means provided with a pair of contacts and at least two windings, one of said windings being energized by the motor current or a function thereof, the other of said windings being energized by the voltage of the motor armature or a function thereof, the two windings acting electro-magnetically on one of said contacts, current being supplied to the motor by way of said contacts, said windings acting in such manner upon the one contact that the motor current energized winding induces the contacts to close, while the winding energized by the voltage of the motor armature induces the contacts to open.

15. In combination with an electric motor having field coils and an armature in series, of a governor having make-and-break contacts in the motor current supply circuit, electro-magnetic means controlling the make-and break contacts, said means energized by the current of the motor or a function thereof for changing the current intensity in a motor current increasing sense and simultaneously energized by the voltage of the motor armature or a function thereof for changing the current intensity in a motor current decreasing sense, and adjustable control means for varying the influence of said electromagnetic means on said make-and-break contacts.

16. In combination, an electric motor having field windings and an armature in series, make-and-break contacts in the motor circuit controlling the supply of current to the motor, and a governor relay having a pivoted armature movable to make and break said contacts, a core having pole pieces at opposite ends of said pivoted armature, a winding on said core connected in parallel to the motor armature for energizing the relay armature to break said contacts, a winding on said core connected in series with the motor armature for energizing said relay armature to make said contacts, the motor current energized winding serving to induce the relay armature to move in a motor current increasing sense, the winding energized by voltage of the motor armature serving to induce the relay armature to move in a motor current reducing sense, a speed control setting coacting with the relay armature, the conjoint function serving to maintain a given motor speed according to the setting of said control.

17. In combination, an electric motor provided with an armature, and eletromagnetic means controlled jointly by the current traversing said motor and the voltage across said armature for automatically increasing and decreasing the average voltage impressed upon said motor as the load imposed upon said motor increases and decreases.

18. The method of governing the speed of an alternating current motor when subjected to a variable load, which comprises periodically increasing the voltage applied to said motor at twice the frequency of the applied voltage, and shifting the point in each voltage cycle at which the voltage is increased in the correct sense to increase the average voltage applied to said motor as the load increases and to decrease the average voltage applied to said motor as the load decreases.

19. The method of governing the speed of an alternating current motor when subjected to a variable load, which comprises energizing said motor at a reduced voltage for a portion of each cycle of the applied voltage, and varying the portion of each applied voltage cycle at which said motor is energized at said reduced voltage inversely with the load imposed upon said motor.

20. The method of governing the speed of an electric motor when subjected to a variable load which comprises repeatedly decreasing and then increasing the voltage applied to said motor, and varying the increment of time separating each voltage decrease and subsequent voltage increase inversely with changes in the load imposed upon said motor.

21. In combination, an electric motor, and electromagnetic means electrically connected with said motor but mechanically independent thereof and controlled by the load imposed upon said motor for varying the average voltage applied to said motor in the same sense with load changes, thereby to hold the speed of said motor reasonably constant under varying load conditions.

22. The method of governing the speed of a variable speed alternating current motor when energized from a source voltage of variable magnitude, which comprises decreasing and then increasing the voltage impressed upon said motor during each half cycle of said source voltage, and varying the increment of time separating each voltage decrease and subsequent voltage increase in the same sense with changes in the magnitude of said source voltage.

23. The method of governing the speed of a variable speed motor when energized from a source voltage of variable magnitude, which comprises repeatedly decreasing and then increasing the voltage impressed upon said motor, and varying the increment of time separating each voltage decrease and subsequent voltage increase in the same sense with changes in the magnitude of said source voltage.

24. In combination, an electric motor, means for repeatedly decreasing and then increasing the voltage applied to said motor, and means for varying the increment of time separating each voltage decrease and subsequent voltage increase inversely with changes in the load imposed upon said motor.

25. In combination, an electric motor adapted for energization from a voltage source of variable magnitude, means for repeatedly decreasing and then increasing the voltage impressed upon said motor fom said source, and means for varying the increment of time separating each voltage decrease and subsequent voltage increase in the same sense with changes in the magnitude of said source voltage.

26. In combination, an electric motor adapted for energization from an alternating voltage source, means for decreasing and then increasing the voltage impressed upon said motor during each half cycle of said source voltage, and means for varying the increment of time separating each voltage decrease and subsequent voltage increase in the same sense with changes in the magnitude of said source voltage.

27. In combination, an electric motor adapted for energization from an alternating voltage source of variable magnitude, means for decreasing and then increasing the voltage impressed upon said motor during each half cycle of said source voltage, and means for varying the increment of time separating each voltage decrease and subsequent voltage increase in the same sense with changes in the magnitude of said source voltage.

HERBERT F. STORM.